G. CHRISTENSON.
PISTON PACKING.
APPLICATION FILED OCT. 25, 1917.

1,273,737.

Patented July 23, 1918.

INVENTOR
George Christenson
BY
J. Parker Smith
ATTORNEY

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

PISTON-PACKING.

1,273,737.  Specification of Letters Patent.  Patented July 23, 1918.

Application filed October 25, 1917. Serial No. 198,418.

*To all whom it may concern:*

Be it known that I, GEORGE CHRISTENSON, a citizen of the United States of America, residing at Jamaica, county of Queens, State of New York, have invented certain new and useful Improvements in Piston-Packing, of which the following is a specification.

Figure 1:
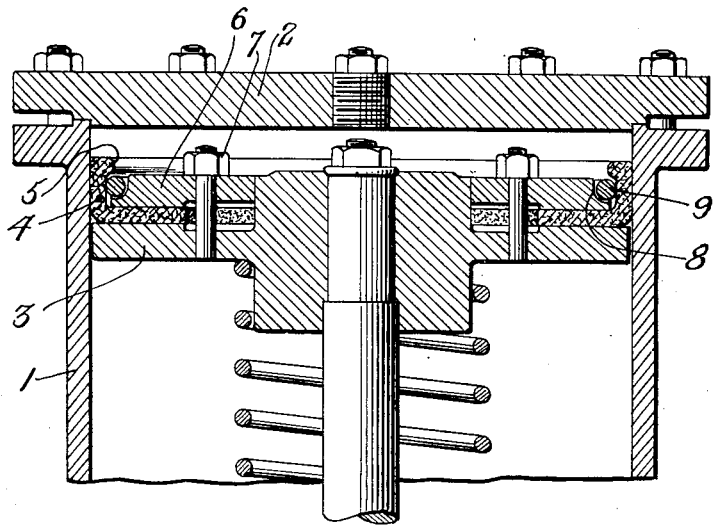
Figure 2:
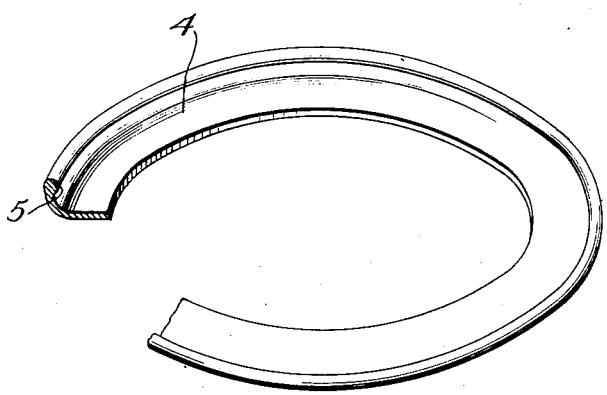

My invention relates generally to piston packing and is more particularly designed to form an efficient and durable packing for the pistons of air brake cylinders. The best form of apparatus at present known to me embodying my invention is illustrated in the accompanying sheet of drawings in which:

Figure 1 is a longitudinal section of a cylinder and piston fitted with my packing, parts being broken away, and Fig. 2 is a perspective view of the packing ring with parts broken away.

Throughout the drawings like reference characters indicate like parts. 1, is the cylinder, 2 the cylinder head and 3 the piston, all of standard construction. 4, is the improved cup-shaped packing ring which has a thickened outer edge formed by an inwardly projecting bead or lip 5. This ring is preferably formed of asbestos cloth treated with rubber, molded into the shape shown by compression in proper dies and vulcanized while in the dies after being given the said shape. This ring is clamped to the piston head by piston follower, 6, held by bolts 7, 7. The follower 6, has an external groove 8, formed in its upper outer surface in which it supports an ordinary split spring steel expander ring 9 of standard construction. This holds the expander 9, in the position shown in Fig. 1, nested closely under the lip 5, and forcing it and the adjacent portions of the packing ring 4, against the cylinder walls. The lip 5, in its turn, serves to hold the expander in position after the parts are assembled.

The main advantages of the invention arise from the fact that the expansive action is concentrated near the outer edge of the packing ring 4, and so insures a tight and even joint between said outer edge and the cylinder wall, while the reinforcing action of the lip transmits the pressure evenly and secures practical uniformity of wearing action of the packing even if the expander presses outward more at some points of the piston circumference than at others. The thickening action of the lip also furnishes an ample supply of material in the packing at the point where the greatest amount of wear will result from the localized action of the expander nested under it. The construction is also inexpensive as the standard spring wire expander shown is the cheapest of all forms.

Having described my invention, I claim:

1. In a piston packing the combination with the piston of a cup shaped packing ring thickened at the outer edge to form an inwardly projecting lip, an elastic, outwardly pressing expander within said ring and means for holding said expander in operative position within said ring and under said lip.

2. In a piston packing the combination with the piston of a packing ring mounted thereon having an inwardly projecting bead forming a lip on its outer edge, a spring metal expander of circular cross section nested under said lip, and a piston follower grooved externally to form a seat for said expander and holding it in operative position under said lip and against the interior of said ring.

GEORGE CHRISTENSON.